(12) United States Patent
Hall et al.

(10) Patent No.: US 8,364,696 B2
(45) Date of Patent: Jan. 29, 2013

(54) EFFICIENT INCREMENTAL PARSING OF CONTEXT SENSITIVE PROGRAMMING LANGUAGES

(75) Inventors: Mark Lee Hall, Redmond, WA (US); Tanveer Ahmed Gani, Bothell, WA (US); Richard Thomas Russo, Redmond, WA (US); Stephan Thomas Lavavej, Redmond, WA (US); Jason Joseph Shirk, Sammamish, WA (US); Mitchell Warren Slep, Seattle, WA (US); Thierry Miceli, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 377 days.

(21) Appl. No.: 12/351,068

(22) Filed: Jan. 9, 2009

(65) Prior Publication Data

US 2010/0185669 A1 Jul. 22, 2010

(51) Int. Cl.
*G06F 7/00* (2006.01)
*G06F 17/00* (2006.01)
*G06F 17/30* (2006.01)

(52) U.S. Cl. ........................... 707/769; 707/773
(58) Field of Classification Search ............ None
See application file for complete search history.

(56) References Cited

U.S. PATENT DOCUMENTS

| | | | |
|---|---|---|---|
| 5,095,432 A | | 3/1992 | Reed |
| 5,313,387 A | | 5/1994 | McKeeman et al. |
| 5,371,747 A | * | 12/1994 | Brooks et al. ........... 714/38.1 |
| 6,976,209 B1 | | 12/2005 | Storisteanu et al. |
| 7,149,680 B2 | | 12/2006 | Storisteanu et al. |
| 7,293,232 B2 | | 11/2007 | Arkhipov et al. |
| 7,391,421 B2 | * | 6/2008 | Guo et al. ............ 345/473 |
| 7,437,667 B2 | | 10/2008 | Storisteanu |
| 7,610,556 B2 | * | 10/2009 | Guo et al. ............ 715/745 |
| 7,698,346 B2 | * | 4/2010 | Henderson ............ 707/781 |
| 2005/0091531 A1 | | 4/2005 | Snover et al. |
| 2005/0114771 A1 | * | 5/2005 | Piehler et al. ......... 717/110 |
| 2010/0220348 A1 | * | 9/2010 | Matsushima ............ 358/1.13 |

OTHER PUBLICATIONS

"All New JavaScript Editor with Intellisense . . . ", retrieved at <<http://www.ajaxlines.com/ajax/stuff/article/all_new.javascript_editor_with_intellisense_.php>>, Oct. 21, 2008, pp. 17.
"About IntelliSense", retrieved at <<http://office.microsoft.com/en-us/frontpage/HP010001761033.aspx>>, Oct. 21, 2008, pp. 2.
"XML Tools in Visual Studio 2008", retrieved at <<http://www.code-magazine.com/Article.aspx?quickid=0712162>>, Oct. 21, 2008, pp. 4.
Shao, Li, "What's New in Visual C++ 2005 IntelliSense?", retrieved at <<http://www.microsoft.com/indonesia/msdn/VC2005IntelliSense.aspx>>, Oct. 21, 2008, pp. 3.
"Adding Intellisense and Refactoring to the T-SQL Editor", retrieved at <<http://blogs.msdn.com/anthonybloesch/archive/2005/09/26/TSQL_intellisense.aspx>>, Oct. 21, 2008, pp. 5.
Lahav, et al., "Incremental Parsing and the C Preprocessor", retrieved at <<http://www.cs.uwaterloo.ca/~elahav/inc_cpp.pdf>>, Oct. 21, 2008, pp. 1-10.

* cited by examiner

*Primary Examiner* — Loan T Nguyen
(74) *Attorney, Agent, or Firm* — Microsoft Corporation

(57) ABSTRACT

Many integrated development environments provide "intelligent feedback" to developers. Current "intelligent feedback" techniques may not work well with source code files comprising context sensitive programming languages because edits to one place in the code may change the meaning of arbitrary other places in the code, thus requiring additional full semantic parses to maintain correctness of the system. As provided herein, context-free "name" parsing may be performed to support entity candidate recursive semantic parsing in determining the meaning of the entity. A name parse may be performed to build and/or update a name table and a range table comprising names of entities and their positions within a source code file. Upon receiving a request to determine the meaning of a selected entity within the source code file, the tables may be queried to determine entity names and locations that are to be semantically parsed to determine a selected entity meaning.

20 Claims, 9 Drawing Sheets

EFFICIENT INCREMENTAL PARSING OF CONTEXT SENSITIVE PROGRAMMING LANGUAGES

BACKGROUND

Software development projects have become increasingly complex, comprising multiple files, directories, classes, functions, etc. Integrated development environments (IDEs) may provide additional information and functionality to aid in the development of these complex software projects. For example, an IDE may provide auto completion, access to descriptions of entities (functions, parameters, lists of functions, etc.), and/or additional information through dynamic tooltips during programming. These techniques mitigate ambiguity in variable names, functions, and/or other entities the developer may be inputting. The time to reference declarations to these entities may be mitigated because the information is directly presented to the user, without the user searching through code files to find declarations of entities.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, a technique for determining a meaning of an entity within a source code file is disclosed herein. The source code file may comprise syntax from context sensitive programming languages. An entity meaning request comprising a selected entity data is received. The selected entity data may comprise a selected entity, a selected entity position (e.g., entity range), and/or other entity data. The entity may comprise a function, method, class, variable, object, and/or any other entity within a source code file. The position may comprise the character position of the entity from the beginning of the source code file. A range table is queried to determine a set of entities (e.g., a set of entity candidates) corresponding to the selected entity data. The range table may comprise a set of ranges (e.g., beginning and ending positions within the source code file) and entities corresponding to the ranges. Upon determining a set of entities corresponding to the selected entity position, a name table is queried to determine a set of positions (e.g., beginning positions and ending positions, entity ranges, etc.) of the set of entities. The name table may comprise entity names with their corresponding ranges.

A recursive semantic parse may be performed upon the set of entities based upon their ranges within the source code file. A parse tree is built based upon the recursive semantic parse. The parse tree may be indexed based upon positions within the parse tree corresponding to entities within the source code file. An entity meaning may be presented based upon querying a parse tree index of the parse tree. For example, a tooltip may be presented with additional information about a function (e.g., parameter types) a developer is currently inputting.

A technique for name parsing is also disclosed herein. A name table may be built based upon a name parse of a source code file. The name parse determines names of entities and locations of entities. The names and locations are used to build a name table comprising names of entities, beginning positions, and ending positions of the corresponding entities. A range table may be built based upon the name table. The range table may comprise a position column configured to store positions from the name table and an entity column configured to store entities corresponding to the positions in the position column. The range table may be sorted by the position column. An incremental name parse may be performed to update the name table and/or range table based upon entities affected by an edit within the source code file. The name table and range table may be used to determine the location of entities that are to be semantically parsed when determining a meaning of an entity.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
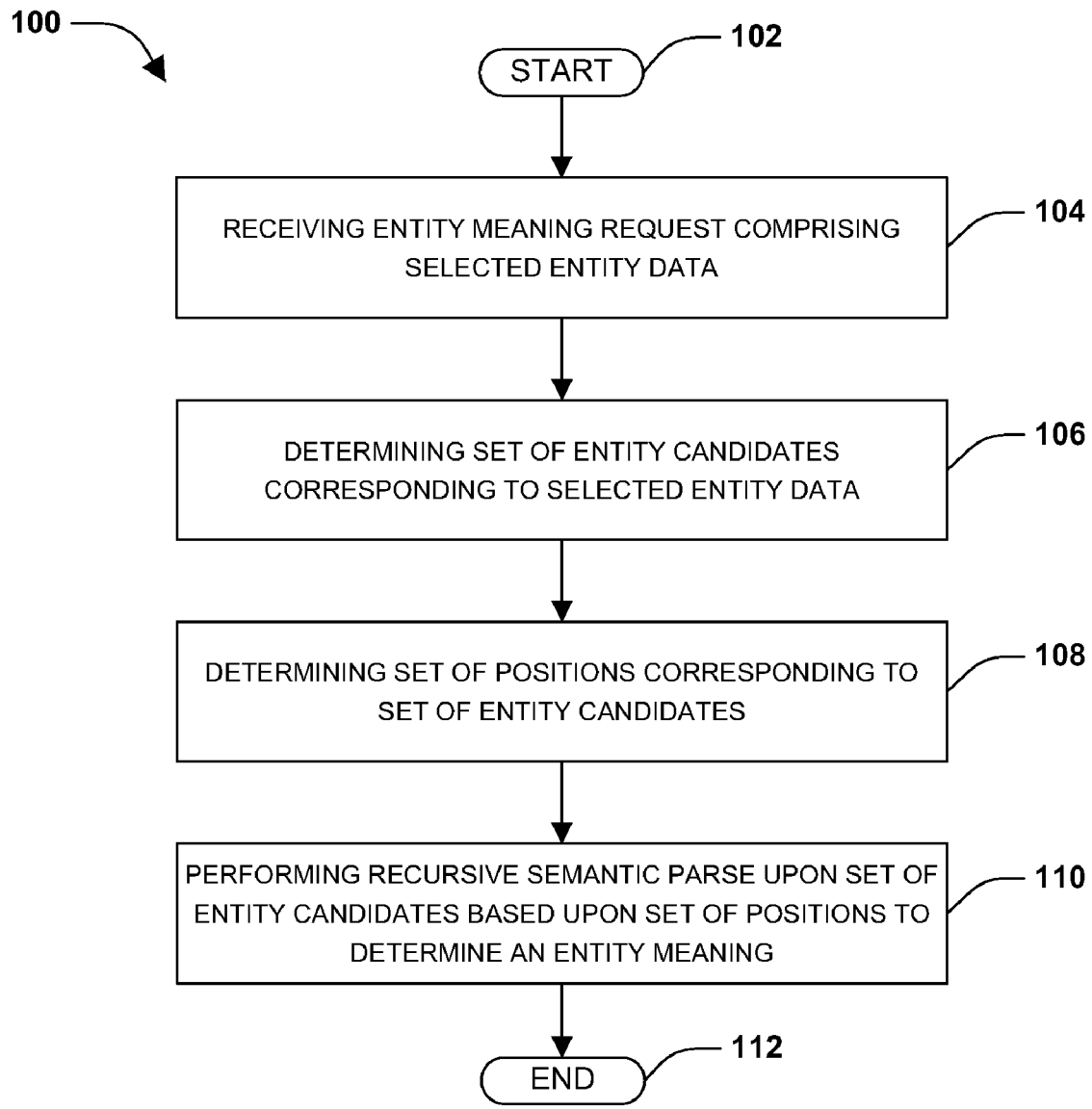
FIG. 1 is a flow chart illustrating an exemplary method of determining a meaning of an entity within a source code file.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Integrated development environments (IDEs) may provide tools and resources for a robust software development experience. An IDE may provide a source code editor, a compiler, a builder, a debugger, class browsers, object inspectors, and/or other tools used to improve a software developer's experience in developing source code. Some IDEs provide "intelligent feedback" to aid developers. The "intelligent feedback" may present additional information regarding classes, variables, functions, and/or other useful information for developing source code. This technique enhances the developer's experience by providing useful suggestions, additional understanding of old and new source code, locations of correct objects and statements, and/or enhanced navigation. The technique may also provide a greater understanding of functions, their parameters, and types of variables.

To provide a meaning of an entity (e.g., provide "intelligent feedback" regarding a function, variable, and/or other entities that a developer expresses interest in), current techniques may perform a top-level semantic parse. The semantic parse may skip source code in function bodies, but may determine the full meaning of declared entities (e.g., distinguishing function declarations, object declarations, class declarations, etc.). The semantic parse may determine the beginning point and ending point of entities. For example, a semantic parse of a source code file may determine that "Func2" is a function with one parameter of type "nt" and a return type of "C::Cint" and that "Func2" has a beginning position of 10 and an ending position of 65.

Performing a top-level semantic parse may be impractical when source programs become large, complex, and/or are developed in a context sensitive language. In context sensitive programming languages, an edit to an entity within a source code file may affect multiple portions of the source program; in fact a small edit may affect the entire source program. Current techniques for providing meanings of entities may not be effective for context sensitive programming languages because a top-level semantic parse of the entire source program may have to be performed after every edit to maintain consistency. Some current techniques may choose to present inaccurate (e.g., out of date) entity meanings to users to avoid repeating top-level semantic parsing of the entire source program.

As set forth herein, name parsing may be performed to gather data which may be used during semantic parsing to determine the meaning of an entity. Name parsing may be performed by a name parse component. The name parse component may be configured to parse ranges within a source code file to determine a set of entity candidates that exist within that range (e.g. a range may include the entire source code file). It may be appreciated that a source code file may be interpreted as at least one data structure that may comprise source code (e.g., a translation unit). The set of entity candidates may comprise the potential names of entities that are declared within the source code and their respective beginning and ending positions within the source code.

The name parse may differ from the semantic parse because the name parse does not determine the exact meaning of the entity (e.g., in the C++ declaration X Y(Z), it is not determined if Y is a function declaration or an object declaration). The name parse may not be powerful enough to distinguish between multiple names that may be declared in a single range, and so reports all names that may be declared (e.g., in the C++ declaration X(Y), X and Y are both entity candidates, because either one may be the declared entity, depending on the surrounding context of the declaration). The name parse may comprise the property where an edit anywhere in a program has no affect on the consistency of the data outside the direct range of the edit. The data resulting from the name parse, the name table, allows the semantic parse to be deferred until a request for a meaning of an entity is received, thus mitigating resources and time because a full semantic parse may not be used to maintain consistency whenever an edit occurs. It may be appreciated that a name parse may be performed incrementally, so the name parse may be used to maintain consistency whenever an edit occurs.

A semantic parser may be modified to create an entity candidate recursive semantic parser. An entity candidate recursive semantic parser may query the name table in addition to an internal symbol table at any time during the semantic parse that a name lookup may be desired. The name table may provide a set of entity candidates that may satisfy the query from the entity candidate recursive semantic parser. The entity candidate recursive semantic parser may determine that an entity candidate may be preferred over entities obtained from its internal symbol table. The entity candidate recursive semantic parser may recursively perform a full semantic parse upon at least one of the entity candidates, which may add new entities to its internal symbol table. The entity candidate recursive semantic parser may thereafter perform name lookup again. The entity candidate recursive semantic parser may determine that an entity from its internal symbol table may be preferred over any entities obtained from the name table, and may proceed with the semantic parse. Otherwise, it may query the name table and/or its internal symbol table further as prescribed by the rules of the language. It may be appreciated that an entity candidate recursive semantic parser may parse a small fraction of the entire source code in response to an entity meaning request.

A name table may be built by a table building component. The table building component may be configured to request the name parse component to perform a name parse on the source code file. The result of the name parse may be used to build the name table comprising columns configured to store names of entities, beginning positions, and ending positions of the entities. A range table may be built based upon the name table. The range table may comprise a column of positions (e.g., ending positions and beginning positions) designated in the name table. The range table may comprise an entity column configured to store entities corresponding to positions within the position column. For example, an entry within the range table may comprise position 62 and entities "func2" and "CClass" because "func2" begins at position 62 and "CClass" spans the position 62. It may be appreciated that a position may not comprise an entity associated with that position. The name table and the range table may be used when a meaning of an entity is determined by a semantic parse. For example, a semantic parser (e.g., the entity candidate recursive semantic parser) may query the range table and/or name table to determine entities (e.g., entity candidates) that are to be parsed and respective entity locations (e.g., entity ranges).

One embodiment of determining a meaning of an entity within a source code file is illustrated by an exemplary method 100 in FIG. 1. At 102, the method begins. At 104, an entity meaning request comprising selected entity data is received. For example an entity meaning request may originate when a user within an IDE places the cursor over an entity within a source code file, and the selected entity data comprises the position of the cursor within the source code file. In another embodiment of act 104, the selected entity data comprises the text of an expression in the evaluation window of a source code debugger. Selected entity data may comprise text, positions, ranges, and/or other information regarding an entity within a source code file.

At 106, a set of entity candidates corresponding to the selected entity data may be determined. The term set of entities may be interpreted as a set of entity candidates. In one example a range table may be queried to determine the set of entity candidates. The range table comprises ranges within the source code file (e.g., beginning positions and ending positions). Entities may be associated with the ranges within the source code file. A query of the range table may be performed to determine the set of entity candidates that correspond to the selected entity data. For example, a selected entity data may comprise a selected entity position corresponding to an entity selected within source code. The selected entity (selected entity position 8) may be declared within a function declaration (positions 4 to 30) within a class declaration (positions 1 to 60). The function and/or class may be associated with the selected entity position 8, because the range between their beginning positions and ending positions span the selected entity position. A set of entity candidates associated with the selected entity position of 8 may comprise the function, class, and selected entity. It may be appreciated that act 106 may be optional. That is, the method may be carried out successfully without performing that which is described at 106.

At 108, a set of positions corresponding to the set of entity candidates may be determined. The set of positions may be an entity range (e.g., beginning and ending positions) of respective entities. In one example a name table may be queried to determine the set of positions. The set of positions may be used by an entity candidate recursive semantic parser to parse the set of entity candidates. For example, a set of entity candidates may comprise a function, class, and selected entity because they correspond to a selected entity position within a selected entity data. The entity names may be used to query the name table to determine their beginning positions and ending positions. It may be appreciated that act 108 may be optional. That is, the method may be carried out successfully without performing that which is described at 108.

At 110, a recursive semantic parse may be performed upon a set of entity candidates based upon a set of positions to determine an entity meaning. It may be appreciated that a set of positions may be interpreted as a set of ranges. The set of positions may be used to reference where in the source code file the entity candidate recursive semantic parse is to be performed initially. The recursive semantic parse may encounter additional named entities whose meanings have not been determined, and whose meanings may be determined for the semantic parse to continue. The entity candidate recursive semantic parser may query the name table to determine additional entity candidate positions corresponding to the named additional entities. A recursive semantic parse may be performed upon the additional entity candidate positions to determine the meaning of any entities defined therein.

It may be appreciated that a recursive semantic parse may be interpreted as an entity candidate recursive semantic parse. In another embodiment of act 110, an entity candidate recursive semantic parse based upon a selected entity data may be performed to determine an entity meaning. The selected entity data may be received within an entity meaning request. The selected entity data may be used to determine entity candidates that the entity candidate recursive semantic parse is to parse to determine the entity meaning. The entity candidate recursive semantic parse may be performed upon respective undefined entities encountered during parsing (e.g., entities within source code whose meaning is unknown and/or undefined, entity candidates, etc.). For respective undefined entities, an entity candidate range may be determined and the entity candidate recursive semantic parse may be performed upon the entity candidate range to determine a defined entity.

After recursively parsing the additional entity candidate positions, an entity candidate recursive semantic parser may perform a verification to determine whether it produced an expected named entity desirable in determining the meaning of a selected entity. If the semantically parsed entity candidate did not produce an expected named entity, then a name table may be queried further to determine a new set of entity candidates that an entity candidate recursive semantic parse may be performed upon to determine an entity meaning. At 112, the method ends.

It may be appreciated that a parse tree and/or collection of parse trees may be built based upon the recursive semantic parse. It may be appreciated that a parse tree may be interpreted as a representation of source code in binary form. The parse tree may be indexed by positions of entities within the source code file. A parse tree index may be queried based upon the selected entity position to determine a node or nodes within the parse tree corresponding to the selected entity. An entity meaning may be extracted from the node. The entity meaning may be presented based upon the query of the parse tree index of the parse tree.

In yet another embodiment of performing a recursive semantic parse of act 110, a semantic parser may be modified to perform the recursive semantic parse based upon at least one entity candidate. Because the recursive semantic parse may have been deferred until a request to determine an entity's meaning is received, a previous context-free parse (e.g., a name parse) may have been performed to determine names of entities and/or their respective locations within a source code file. Entities discovered within the context-free parse may be designated as entity candidates because they might not actually exist at the determined location.

The recursive semantic parser (e.g., the modified semantic parser) may begin parsing at an arbitrary place in the source code file as requested by a client system (e.g., a request comprising an entity position may be received from a user to determine a meaning of an entity). During parsing, the recursive semantic parser may encounter a named entity within the source code. When the named entity is encountered, the name may be looked up simultaneously in an internal symbol table and a name table according to the name lookup rules of the source code language. The name lookup rules of the source code language may prefer an entity candidate found in a name table over an entity found in an internal symbol table, whereupon the current parse may be suspended.

A recursive semantic parse may be performed on a range associated with the entity candidate. Upon a return from the recursive semantic parse, the internal symbol table may be queried again (but not the name table) to verify that the preferred entity was defined by the recursive semantic parse. If the preferred entity is found, then the semantic parsing of the selected entity continues. Otherwise, name lookup proceeds to the next step as prescribed by the name lookup rules of the source code language. It may be appreciated that this technique may iterate based upon the source code language rules.

In yet another embodiment, a context-sensitive parser may be modified to create a context-free parser. For respective execution points in the context-sensitive parser where name lookup is performed in order for the parse to proceed, the name lookup is omitted. The parse may be bifurcated, whereby a respective sub-parse may assume a possible legal outcome of the omitted name lookup at that execution point. A sub-parse may continue parsing until a parsing error is encountered or an entity is declared. An entity candidate is created based upon a sub-parse determining an entity that may be declared.

It may be appreciated that other techniques may be employed to create a context-free parser to produce entity candidates for a context-sensitive language, including creating a new context sensitive parser to do so. It may also be appreciated that entity candidates in a source code file may be created before the recursive semantic parse or during the recursive semantic parse.

It may be appreciated that a name parser for a context-free language may be created using parsing techniques less powerful or robust than context-free parsing (e.g., regular expression parsing). That is, a streamlined context-free name parser may be created. It may be appreciated that the name parser thus created may outperform or otherwise provide advantages not available from its corresponding context-free parser (e.g., may require fewer resources and/or operate more quickly since it is streamlined). It may be appreciated that one or more of the methods and/or systems described herein also have application to and thus benefit parsers for context-free languages.

Figure 2:
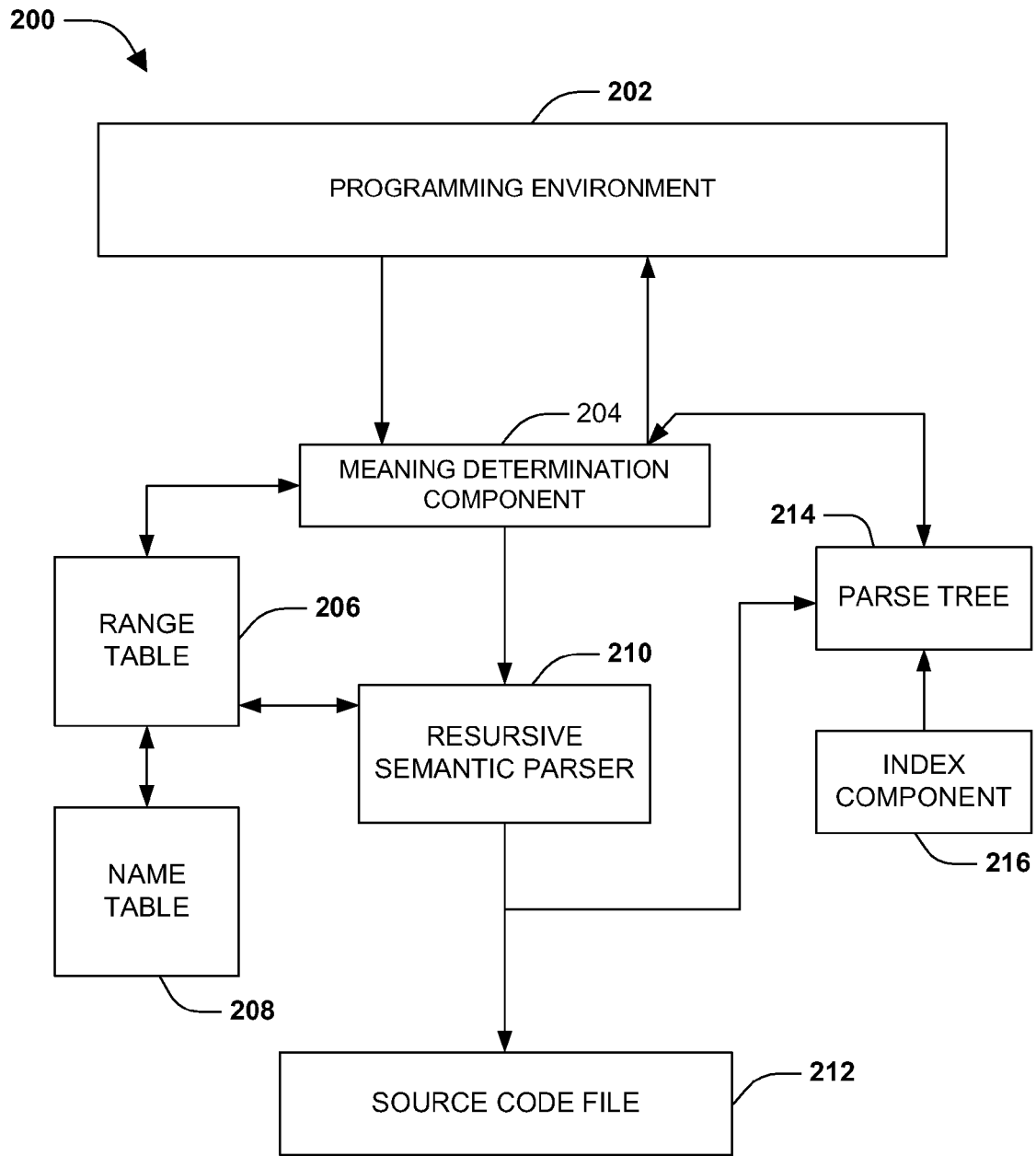
FIG. 2 is a component block diagram illustrating an exemplary system for determining a meaning of an entity within a source code file.

FIG. 2 illustrates an example of a system 200 configured to determine a meaning of an entity within a source code file 212. The source code file 212 may be associated with a programming environment 202 (e.g., an integrated development environment). It may be appreciated that the source code file may comprise code written in a context sensitive programming language. The system 200 may comprise a meaning determination component 204. The meaning determination component 204 may be configured to receive an entity meaning request comprising a selected entity data. The selected entity data may comprise a selected entity position. The entity meaning request may be received from the programming environment 202. The meaning determination component 204 may be configured to query a range table 206 to determine a set of entities and/or entity candidates corresponding to the selected entity data. The meaning determination component 204 may be configured to query a name table 208 using the set of entities to determine a set of positions corresponding to the set of entities and/or additional attributes relevant to meaning determination.

Because edits may occur within the source code file 212, positions of entities may be adjusted based upon an edit list and/or a sequence of range tables comprising range tables with corresponding timestamps. Positions may comprise timestamps corresponding to the time the position was created or updated. Range tables in the range table sequence may comprise timestamps corresponding to the time the range table was created. Range tables may also comprise the edit list being processed when the name table was created. When a new edit is processed, the sequence of range tables is traversed, starting with the range table having the newest timestamp. When traversing between two range tables in the sequence, the position of the edit is adjusted accounting for edits between the two range tables. When a range table in the sequence is found to contain the edit (adjusting for intervening edits), the entities in the name table associated with the edit are determined. For respective entities, respective positions are updated accounting for respective edits having timestamps newer than the timestamp of the position, whereupon the timestamp of the position is updated to the timestamp of the newest edit. A name parse is performed upon the updated ranges and a new range table is created, comprising the results of the name parse, the new edit, and the timestamp of the new edit. The new range table is added to the range table sequence. It may be appreciated that the meaning determination component 204 may operate incrementally, thus the positions that are adjusted may be less than the total number of positions/ranges.

A recursive semantic parser 210 may be configured to perform an entity candidate recursive semantic parse based upon the set of positions. For example a recursive semantic parse may be performed upon the set of entities (e.g., set of entity candidates) and/or additional entities encountered (e.g., undefined entities required by but not yet defined in the current semantic parse). The set of entities may comprise the beginning positions and ending positions of entities that are to be parsed. If additional entities are encountered, the recursive semantic parser 210 may query the range table 206 and/or a name table 208 to determine additional entity positions. The beginning and ending positions may be utilized by the recursive semantic parser 210 to mitigate the time used to determine the meaning of the selected entity by parsing only those entities that are used to define the selected entity.

The recursive semantic parser 210 may be configured to build a parse tree 214 based upon the recursive semantic parse. The parse tree 214 may comprise nodes corresponding to entities and their entity meanings. An index component 216 may be configured to index the parse tree based upon positions of the entities within the source code file 212. The index component 216 may traverse the parse tree 214 to build a parse tree index. It may be appreciated that a collection of parse trees may be created, thus indexing the collection of parse tress allows meaningful information to be determined and extracted without tying them together.

The meaning determination component 204 may be configured to present the entity meaning of the selected entity based upon a query of the parse tree index of the parse tree 214. The meaning determination component 204 may extract the entity meaning from a node or nodes within the parse tree 214.

Figure 3:
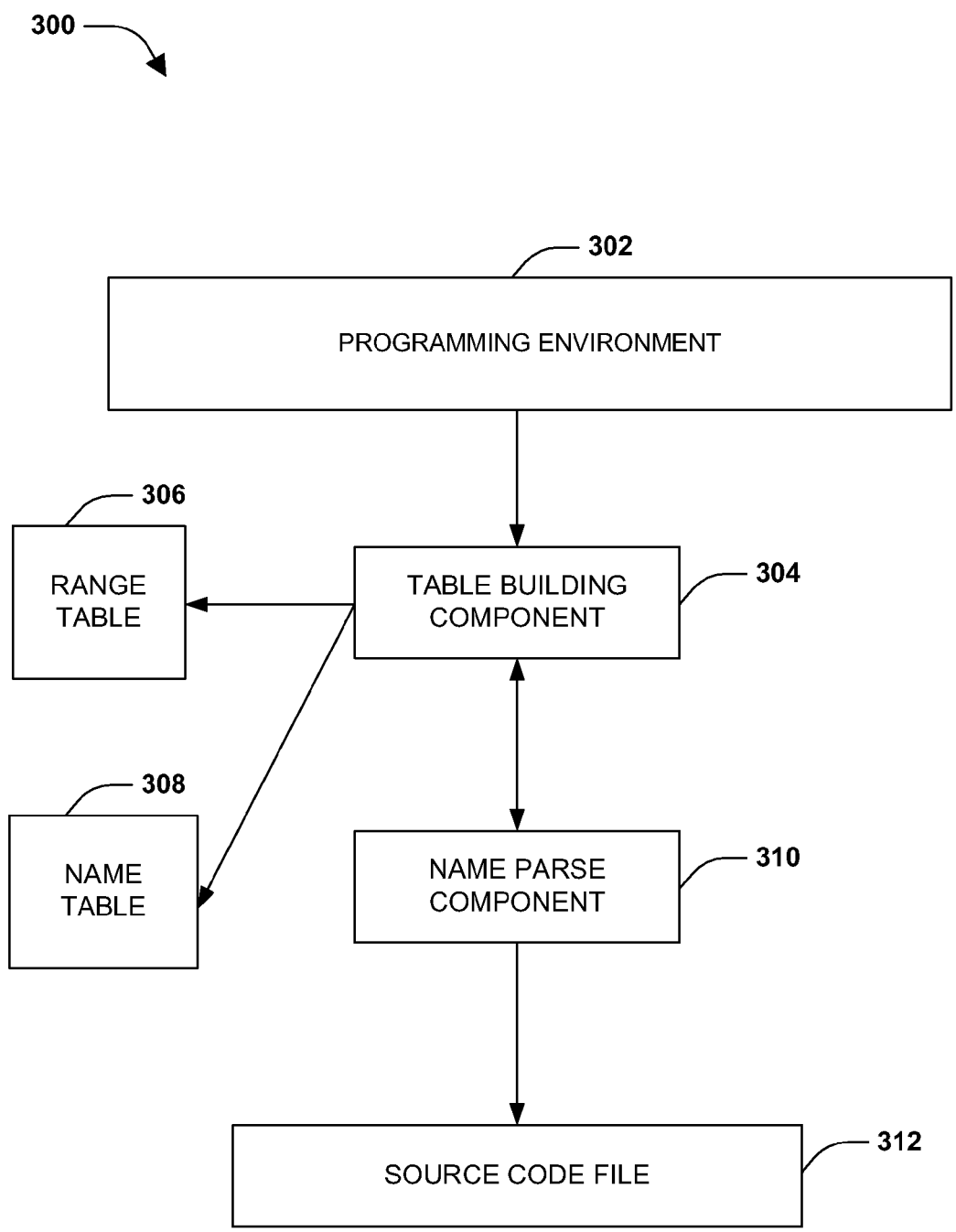
FIG. 3 is a component block diagram illustrating an exemplary system for performing a name parse.

FIG. 3 illustrates an example of a system 300 configured to perform a name parse. The name parse may be performed to build a name table 308 and/or range table 306, which may be used in determining an entity meaning within a source code file 312 associated with a programming environment 302. The system 300 may comprise a table building component 304 configured to request a name parse component 310 to parse (e.g., perform a name parse) the source code file 312 to determine a set of entity data. The set of entity data may comprise entity names, beginning positions, and/or ending positions of entities within the source code file 312. The table building component 304 may be configured to make the parse request in response to determining the source code file 312 has been opened within the programming environment 302.

The name parse component 310 may be configured to perform the name parse to determine the set of entity data comprising a set of entity names and a set of entity positions. It may be appreciated that the name parse component 310 may not perform a semantic parse to determine the meaning of entities (e.g., determine if an entity is a class, function, or object declaration). The name parse may be performed (e.g., the name table 306 and the range table 308 are created and maintained) in lieu of a full semantic parse, thus mitigating resources and/or time used in performing semantic parses and/or maintaining the result of the semantic parses (e.g., performing additional full semantic parses in response to edits). The name parse may be performed incrementally. The name table 308 and the range table 306 may be built based upon the name parse using the set of entity data. These tables provide entity names and their locations within the source code file 312, which may be used in determining an entity's meaning.

The table building component 304 may be configured to build the name table 308 comprising an entity column configured to store names of entities within the source code file 312, a begin column configured to store positions corresponding to the beginning positions of entities within the source code file 312, and an end column configured to store positions corresponding to the ending positions of entities within the source code file 312. The name table 308 may be queried to determine locations of entities within the source code file 312.

It may be appreciated that the name table may comprise additional information regarding entities (e.g., attributes, class, namespace, etc.).

The table building component 304 may be configured to build the range table 306 based upon at least one entry within the name table 308. The range table 306 may comprise a position column configured to store positions from the begin column and/or end column of the name table 308. The range table 306 may comprise an entity column configured to store entities corresponding to the positions in the position column. For example, the position column may comprise the character position 36. Three entities (e.g., a class, function, and object) may begin at, end at, and/or span across the character position 36, therefore the entity column may comprise the entity names of the three entities. In another example, the position column may comprise the character position 90, corresponding to an end position within the name table. No entities may span from character position 90 to the next position in the table, therefore the entity column may comprise no entities.

The table building component 304 may be configured to sort the range table 306 based upon the positions within the position column (e.g., smallest character disposition to largest character disposition). It may be appreciated that sorting the position column of the range table may optimize queries upon the range table. The range table 306 may be queried to determine what entities may correspond to a location (e.g., a selected entity position) within the source code file 312. During a determination of an entity meaning, entities that are to be initially parsed may be determined based upon querying the range table 306 to determine entities that may be defined within a selected entity position. During an entity candidate recursive semantic parse, entities whose meanings are required to determine the meanings of the initially parsed entities may be determined based upon querying the range table 306.

Figure 4:
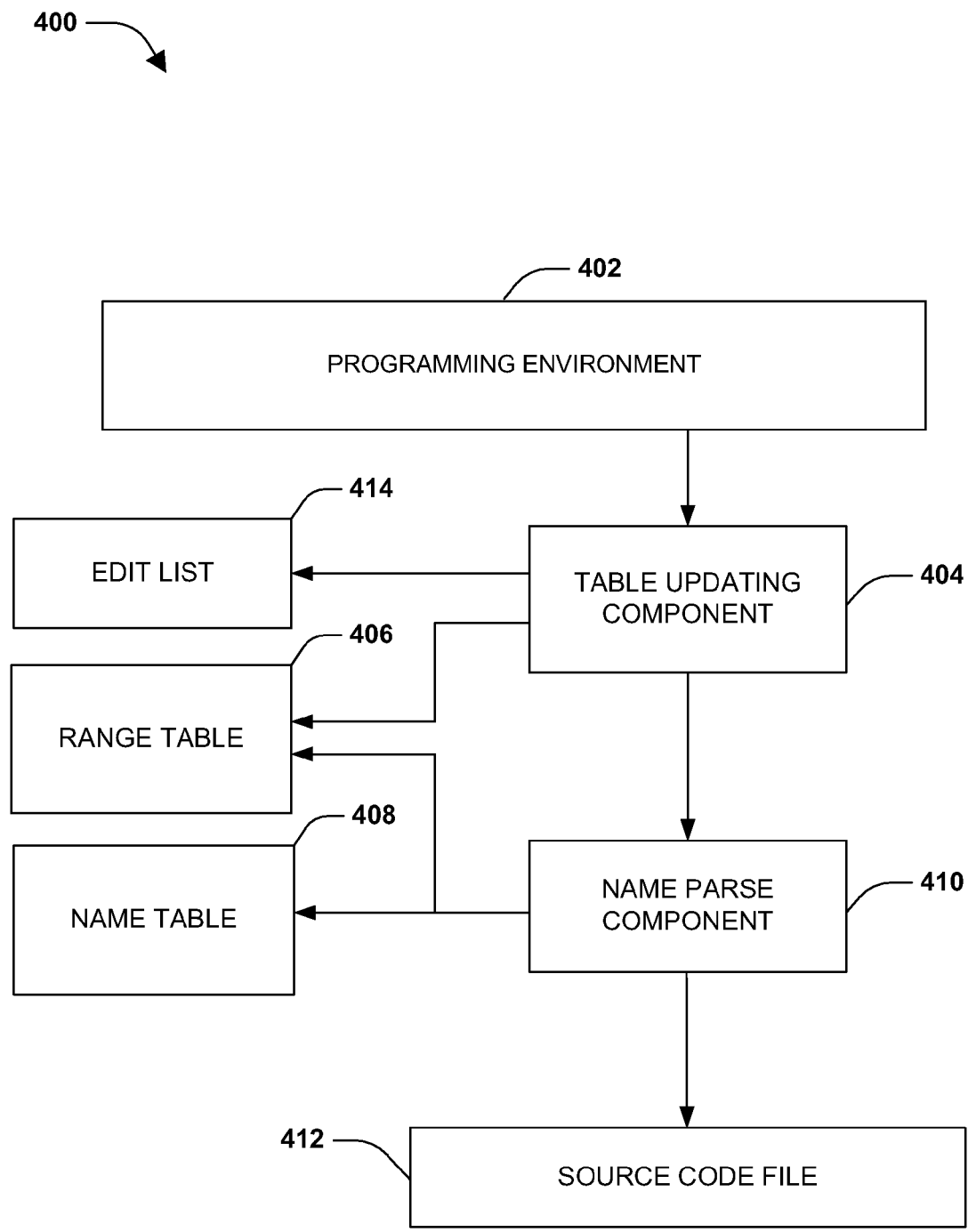
FIG. 4 is an illustration of an example of updating a name table and range table based upon an edit within a source code file.

FIG. 4 illustrates an example of a system 400 configured to update a name table and/or range table based upon an edit within a source code file. A source code file 412 may be associated with a programming environment 402. Within the programming environment 402, a user may be able to create and/or edit the source code file 412. When an edit occurs, entries within a name table 408 and/or a range table 406 may be affected by the edit. For example, entities may be removed or added; beginning positions and/or ending positions of entities may change; etc.

The system 400 comprises a table updating component 404 and a name parse component 410. The table updating component 404 may be configured to determine at least one edit occurred within an edit range of the source code file 412. For example, the table updating component 404 may determine a user added source code to the source code file 412 within the programming environment 402. The table updating component 404 may update an edit list based upon keystrokes and/or corresponding positions of the keystrokes, thus allowing a merger of adjacent keystrokes for optimization.

The table updating component 404 may be configured to query a sequence of range tables (e.g., the range table 406) to determine whether at least one affected entity exists (e.g., the edit may change the position of an entity; the edit may remove an entity; etc.). Querying the range table 406 may comprise querying the name table 408 to determine the positions of the affected entities because the positions may be used to locate the affected entities when an incremental name parse is performed. Upon determining at least one affected entity exists within the range table 406, the at least one affected entity is removed from the name table 408. The table updating component 404 may request the name parse component 410 to perform an incremental name parse upon the range of any affected entity within the source code file 412. If no affected entities exist within the range table 406, then the incremental name parse is performed upon that range in the source code file 412. The incremental name parse may determine entity names, beginning positions, and/or ending positions of entities within ranges thus parsed in the source code file 412.

The table updating component 404 may be configured to update the name table 408 and/or the range table 406 based upon the incremental name parse. The range table 406 may be updated based upon the updated name table 408. Updating the range table 406 may comprise maintaining a sorted order of the range table 406 based upon positions within a position column of the range table 406. It may be appreciated that during update, entities that may be affected from an edit may be updated, while other entities within the range table are not.

In another embodiment, the table updating component 404 may be configured to update the name table 408 and the range table 406 in response to an edit at an edit position within the source code file 412. The table updating component 404 may query the range table 406 to determine a set of ranges associated with the edit position. The table updating component 404 may perform an incremental name parse upon the set of ranges. The name table 408 and the range table 406 are updated during the incremental name parse.

Figure 5:
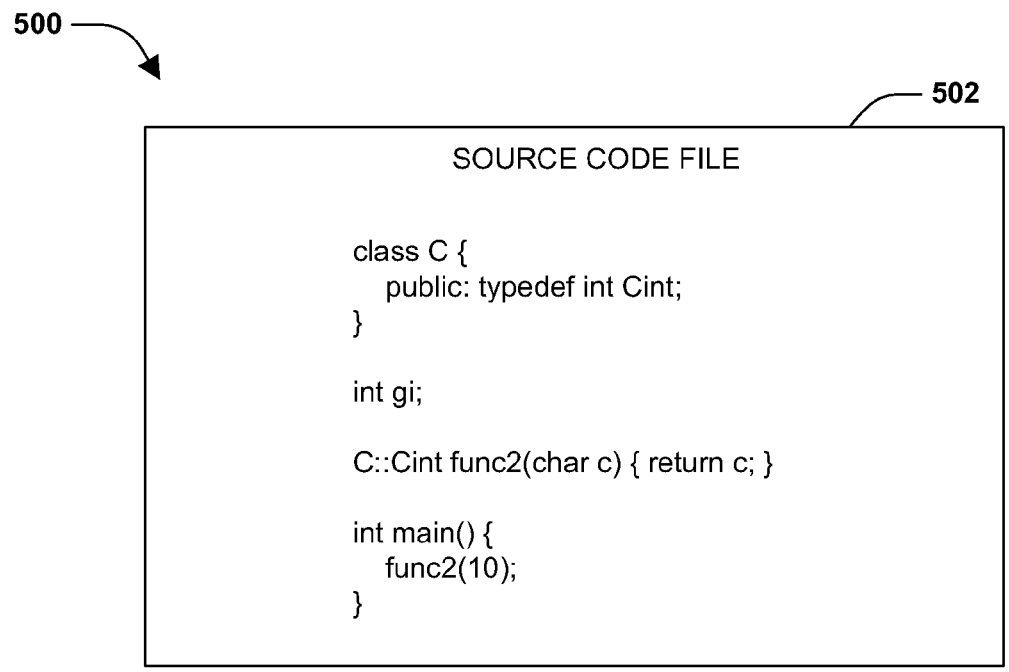
FIG. 5 is an illustration of an example of creating a name table and a range table based upon a name parse of a source code file.

FIG. 5 illustrates an example 500 of creating a name table 504 and a range table 506 based upon a name parse of a source code file 502. The source code file 502 comprises source code written in a context sensitive programming language. A name parse may be performed on the source code file 502 to determine the names of entities and/or their positions (e.g., beginning positions and ending positions). The initial name parse may be used to create the range table 506 and the name table 504. Incremental name parses may be used to maintain and/or update the tables in response to edits by a user. The name parse and tables are an efficient technique to facilitate determining entity meanings because a semantic parse may be deferred until a request to determine an entity meaning is received, as opposed to performing an initial full semantic parse and subsequent full semantic parses as may be needed after edits to create and maintain a structure corresponding to entity meanings. Once a request is received, then a semantic parse may be invoked and may utilize the name table 504 and/or range table 506 to determine the meaning of an entity. To mitigate the number of entities that may be parsed, the name table may be utilized by the semantic parse to parse entities used in determining the semantic meaning of an entity, as opposed to every entity.

The result of the name parse may be used to create the name table 504 comprising a name column, a begin pos column, an end pos column, and/or additional context free information. The name column comprises the names of entities within the source code file 502 discovered through the name parse. The begin pos column comprises the character position of the beginning position of the entity declaration. The end pos column comprises the character position of the ending position of the entity declaration. For example, the declaration for the entity "C" begins at character position 1 and ends at character position 48. The declaration for the entity "Cint" begins at character position 28 and ends at character position 46, thus "Cint" is within the declaration for the entity "C".

Once the name table 504 is created, then the range table 506 may be created and/or sorted by position. It may be appreciated that the range table may be built simultaneously with the name table, or independent of the name table. It may be appreciated that a range table may be based upon an inversion of the entities, having overlapping ranges, within the name table, wherein positions may be used to create non-overlapping ranges that entities may be associated with, thus allowing quick lookup based on positions. The range table 506 may comprise a column of positions extracted from the name table 504 (e.g., begin pos and end pos). The range table 506 may also comprise a column configured to store entities corresponding to respective positions within the position column. It may be appreciated that at least one position may be interpreted as a range that entities may be associated with. Positions may be sorted for non-overlapping sub ranges and entities may be associated with ranges between positions. For example, "C" and "Cint" correspond to the character positions (e.g., range) between the position 28 and the position 46. In another example, "func2" corresponds to the character positions between the position 66 and the position 95. In yet another example, no entities correspond to the character positions between the position 95 and position 101. The range table 506 may be used to efficiently determine entities that correspond to a specified position within the source code file 502. Using the range table 506 and the name table 504, a location of an entity within the source code file 502 may be determined, thus allowing a recursive semantic parse to quickly determine portions of the source code file 502 that are to be parsed to determine a meaning of an entity within the source code file 502.

Figure 6:
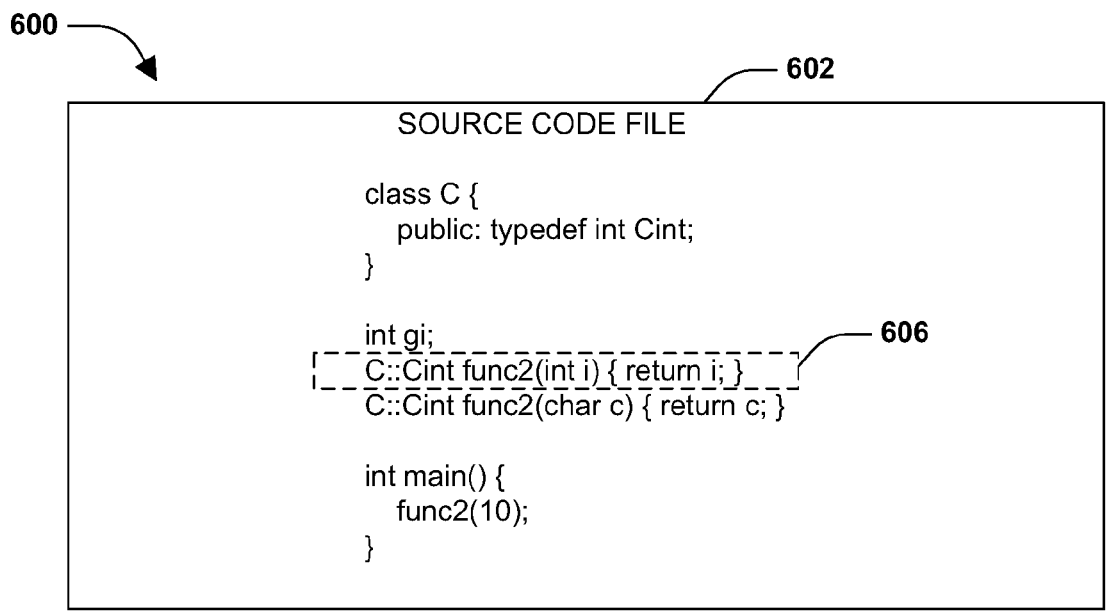
FIG. 6 is an illustration of updating a name table and a range table based upon an edit within a source code file.
Figure 6:
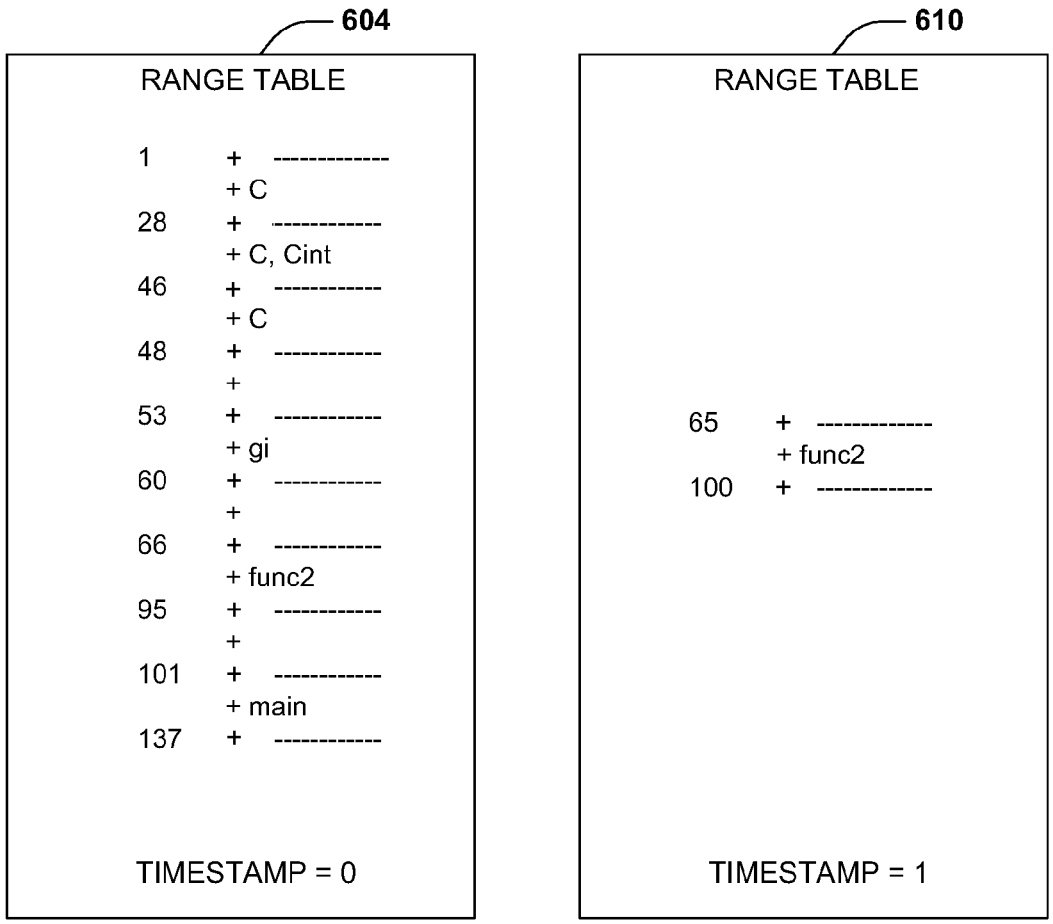

FIG. 6 illustrates an example 600 of an edit occurring within a source code file 602. An initial range table 604 with a timestamp of 0 may have been created based upon an initial name parse of the source code file 602. An edit 606 may occur within the source code file 602. The edit comprises 35 characters of additional source code added at character position 65. A range table 610 may be created based upon the edit 606 within the source code file 602 using an incremental name parse. The range table 610 has a timestamp of 1, which is greater than the timestamp of the initial range table 604.

In one embodiment of updating a name table and a range table, an incremental update may be performed after an edit within a source code file. An edit within the source code file may affect the position of at least one entity occurring after the edit position. Because positions may be located in range tables, name tables, and/or other places, it may be undesirable to update all of the affected entity positions after each edit (e.g., there may be a large number of entity positions created by a name parse of the source code file). To mitigate the resources used to update the affected entity positions, a technique to incrementally update the positions may be employed.

In one example of incrementally updating positions in range tables and name tables due to an edit, an initial name parse may be performed to create an initial name table and an initial range table within a range table sequence. For respective keystrokes performed after the initial name parse, a timestamp greater than previous keystroke timestamps is accorded to the keystroke. Respective entries in the range table sequence are created for the respective keystrokes, and comprise the entities and positions affected by the keystrokes, the keystroke, and the timestamp of the keystroke. For respective entities within the name table, a timestamp may be created corresponding to the last time an entity's begin position and end position were update (e.g., during the processing of a keystroke). It may be appreciated that the timestamp within the initial range table may have to be less than the timestamp of any keystroke.

For respective keystrokes performed after the initial name parse, a timestamp greater than previous keystroke timestamps is accorded to the keystroke. For respective range tables within the range table sequence, beginning with the range table having the newest timestamp, a query may be performed to determine if the keystroke falls within any range therein. If no range is found, then the next range table in the range table sequence is queried, after first adjusting the query position by the affect of the keystroke stored in the range table just queried. It may be appreciated that the query of respective range tables may be repeated until a resulting range is determined. The range may be determined because the initial range table may comprise all ranges within the source code file.

For respective entities within the resulting range, a begin position and end position of the respective entity may be needed within the name table. The begin position and end position of the respective entity may be translated into current positions by adjusting for keystrokes newer than the timestamp. The adjusted begin and end positions may be added to a range list to be used in the following act. The respective entity may be removed from the name table.

In anticipation of a name parse to be performed upon the range list, a new range table may be created with the timestamp of the current keystroke, and added to the range table.

For respective begin and end positions of the range list, an incremental name parse may be performed from the begin position to the end position. For respective new entities encountered, the new entity may be added to the name table with a timestamp of the current keystroke. The entity and its respective begin and end positions may be added to the new range table with the timestamp of the current keystroke.

Once updated, the range table sequence may be used in determining entities that may be associated with a position of an entity meaning request. In one example of starting a recursive semantic parse, respective range tables within a range table sequence may be queried starting with the range table with the newest timestamp. If no range is found then the next range table in the range table sequence may be queried upon first adjusting the query position by the appropriate keystrokes. This may be repeated within a loop until a resulting range of the query is determined. The range may be determined because the initial range table may comprise all ranges within the source code file. Positions associated with the resulting range and/or its corresponding entities may be translated into current positions by adjusting based upon keystrokes newer than the timestamp of the resulting range.

It may be appreciated that adjacent keystrokes may be combined to mitigate the number of updates to the range table sequence and name table, and the number of range tables in a range table sequence. It may also be appreciated that entities may be updated within a name table rather than being removed and re-added.

Figure 7:
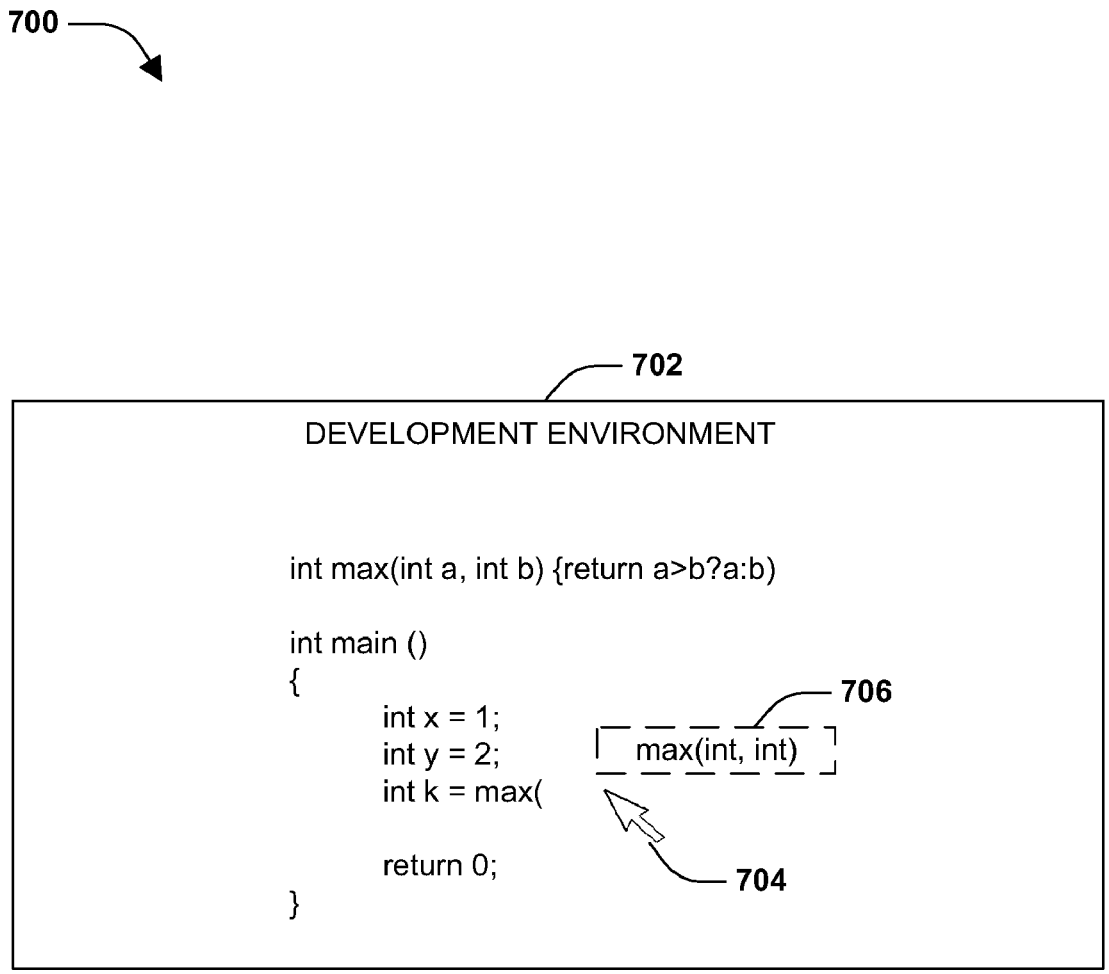
FIG. 7 is an illustration of presenting an entity meaning within a development environment.

FIG. 7 illustrates an example 700 of presenting an entity meaning 706 within a development environment 702. The development environment 702 may comprise source code that a user may interact with (e.g., perform edits). An entity meaning request 704 may be invoked by the user and/or development environment 702. For example, the user begins typing "max(". In response, a determination may be made (e.g., the method in FIG. 1) as to the meaning of the entity "max". For example, the correct function name, parameters, and/or types may be displayed. The entity meaning 706 may be presented to the user to provide a more robust experience in developing the source code file.

It may be appreciated that the subject matter presented herein may be implemented in various ways. For example the determination of a meaning of an entity may be implemented within a non-interactive command-line complier, edit-and-continue environments, intelligent feedback, interactive code debugging, etc.

Figure 8:
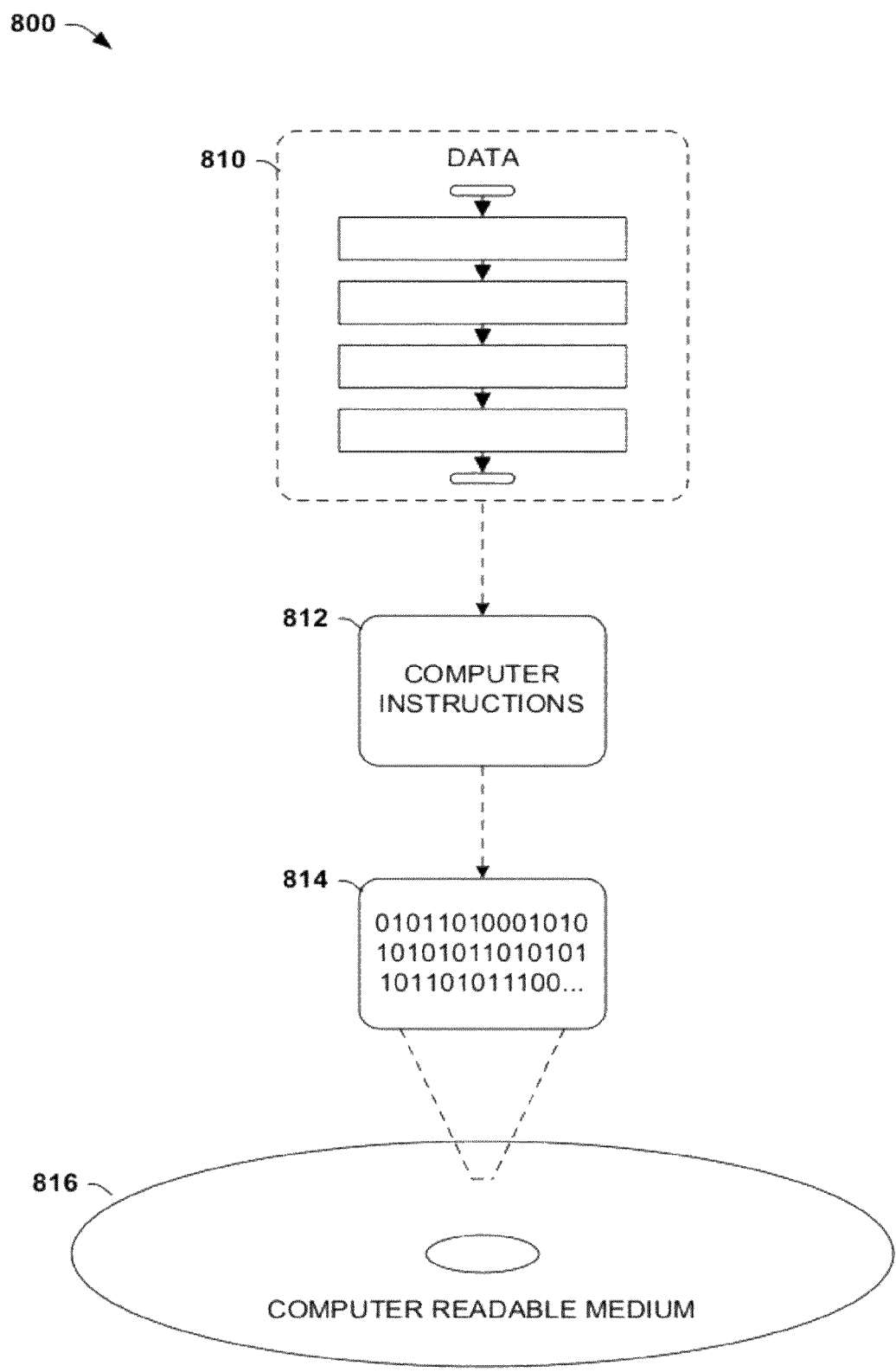
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 810. This computer-readable data 810 in turn comprises a set of computer instructions 812 configured to operate according to one or more of the principles set forth herein. In one such embodiment 800, the processor-executable instructions 814 may be configured to perform a method, such as the exemplary method 100 of FIG. 1, for example. In another such embodiment, the processor-executable instructions 814 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
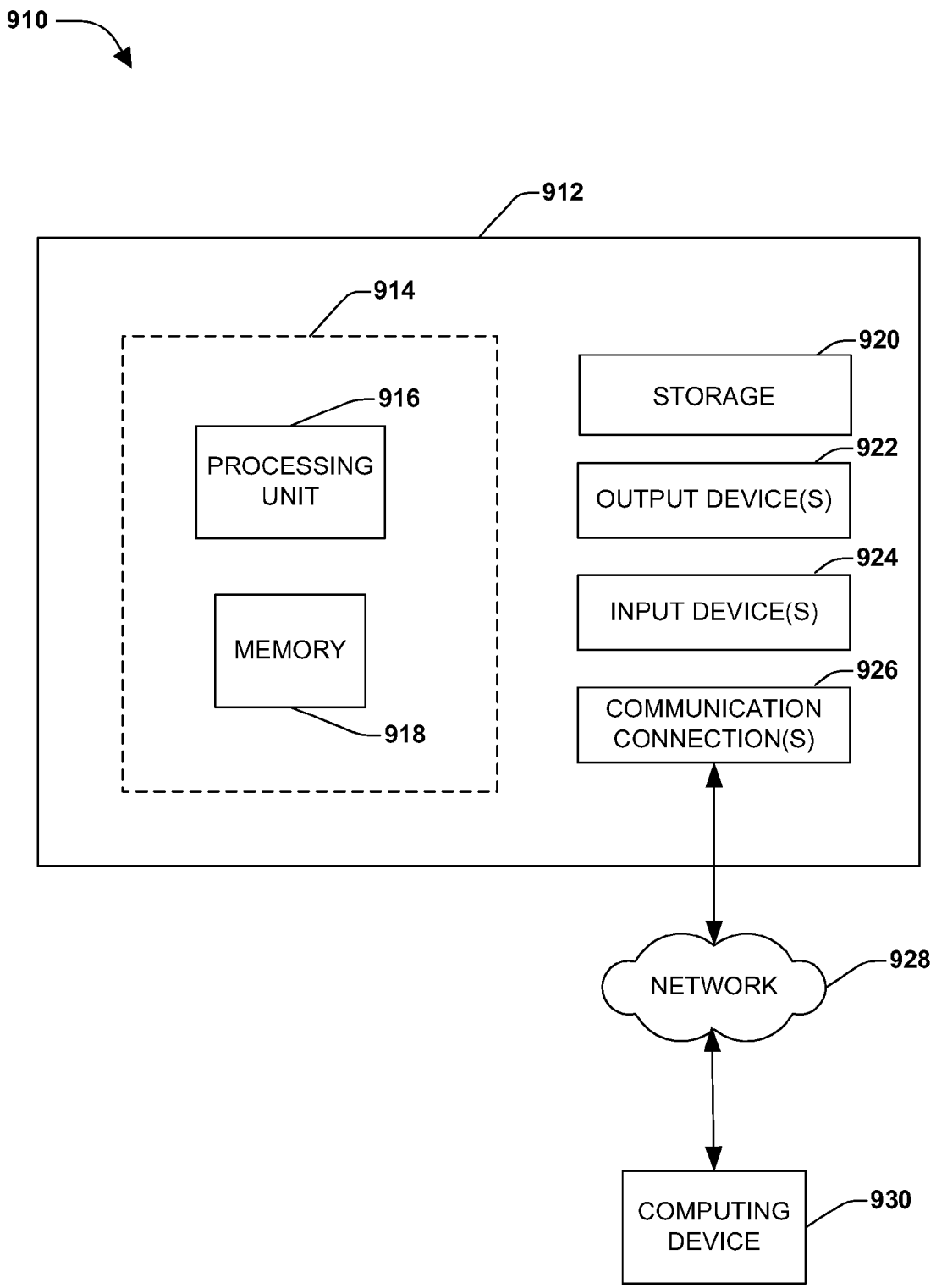
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for determining an entity meaning of a programming entity within a source code file, comprising:
    performing a name parse upon a source code file to create a set of entity data comprising programming entities, beginning positions of programming entities, and ending positions of programming entities;
    building a name table based upon the set of entity data, the name table comprising:
        an entity column configured to store names of programming entities within the source code file;
        a begin column configured to store positions corresponding to the beginning positions of programming entities within the source code file; and
        an end column configured to store positions corresponding to the ending positions of programming entities within the source code file;
    receiving an entity meaning request for an entity meaning of a programming entity within the source code file; and
    performing an entity candidate recursive semantic parse within the source code file, using the name table, to determine the entity meaning of the programming entity, the performing an entity candidate recursive semantic parse comprising:
        identifying a parse range based upon querying the name table using a request position within the source code file the request position specified within the entity meaning request; and
        performing the entity candidate recursive semantic parse upon the parse range to determine the entity meaning of the programming entity.

2. The method of claim 1, the set of entity data associated with at least one of a function, a method, a class, a variable, or an object.

3. The method of claim 1, comprising:
    upon detecting an edit to the source code file, performing an incremental name parse to update the name table.

4. The method of claim 1, comprising:
    determining an entity candidate based upon querying a range table using information within the entity meaning request; and
    performing the entity candidate recursive semantic parse upon the entity candidate to determine whether the entity candidate comprises the programming entity.

5. The method of claim 4, the performing the entity candidate recursive semantic parse upon the entity candidate comprising:
    determining a location of the entity candidate within the source code file based upon querying the name table; and
    performing the entity candidate recursive semantic parse upon the location of the entity candidate.

6. The method of claim 1, the performing an entity candidate recursive semantic parse comprising:
for respective undefined programming entities not defined within an internal symbol table, performing the entity candidate recursive semantic parse to determine a defined programming entity and determining whether the defined programming entity comprises the programming entity.

7. The method of claim 1, comprising:
building a range table based upon the name table, the range table comprising:
a position column configured to store beginning positions and ending positions from the name table; and
an entity column configured to store programming entities relative to positions in the position column.

8. A system for determining an entity meaning of a programming entity within a source code file, comprising:
one or more processing units; and
memory comprising instructions that when executed by at least some of the one or more processing units, provide for:
a name parse component configured to:
perform a name parse upon a source code file to create a set of entity data comprising programming entities, beginning positions of programming entities, and ending positions of programming entities;
a table building component configured to:
build a name table based upon the set of entity data, the name table comprising:
an entity column configured to store names of programming entities within the source code file;
a begin column configured to store positions corresponding to the beginning positions of programming entities within the source code file; and
an end column configured to store positions corresponding to the ending positions of programming entities within the source code file;
a meaning determination component configured to receive an entity meaning request for an entity meaning of a programming entity within the source code file; and
a recursive semantic parser configured to perform an entity candidate recursive semantic parse within the source code file, using the name table, to determine the entity meaning of the programming entity, the performing an entity candidate recursive semantic parse comprising:
identifying a parse range based upon querying the name table using a request position within the source code file, the request position specified within the entity meaning request; and
performing the entity candidate recursive semantic parse upon the parse range to determine the entity meaning of the programming entity.

9. The system of claim 8, the set of entity data associated with at least one of a function, a method, a class, a variable, or an object.

10. The system of claim 8, comprising:
a table updating component configured to:
upon detecting an edit to the source code file, perform an incremental name parse to update the name table.

11. The system of claim 8, the recursive semantic parser configured to:
determine an entity candidate based upon querying a range table using information within the entity meaning request; and
perform the entity candidate recursive semantic parse upon the entity candidate to determine whether the entity candidate comprises the programming entity.

12. The system of claim 11, the recursive semantic parser configured to:
determine a location of the entity candidate within the source code file based upon querying the name table; and
perform the entity candidate recursive semantic parse upon the location of the entity candidate.

13. The system of claim 8, the recursive semantic parser configured to:
for respective undefined programming entities not defined within an internal symbol table, perform the entity candidate recursive semantic parse to determine a defined programming entity and determine whether the defined programming entity comprises the programming entity.

14. The system of claim 8, the table building component configured to:
build a range table based upon the name table, the range table comprising:
a position column configured to store beginning positions and ending positions from the name table; and
an entity column configured to store programming entities relative to positions in the position column.

15. A computer-readable medium comprising processor-executable instructions that when executed perform a method for determining an entity meaning of a programming entity within a source code file, comprising:
performing a name parse upon a source code file to create a set of entity data comprising programming entities, beginning positions of programming entities, and ending positions of programming entities;
building a name table based upon the set of entity data, the name table comprising:
an entity column configured to store names of programming entities within the source code file;
a begin column configured to store positions corresponding to the beginning positions of programming entities within the source code file; and
an end column configured to store positions corresponding to the ending positions of programming entities within the source code file;
receiving an entity meaning request for an entity meaning of a programming entity within the source code file; and
performing an entity candidate recursive semantic parse within the source code file, using the name table, to determine the entity meaning of the programming entity, the performing an entity candidate recursive semantic parse comprising:
identifying a parse range based upon querying the name table using a request position within the source code file the request position specified within the entity meaning request; and
performing the entity candidate recursive semantic parse upon the parse range to determine the entity meaning of the programming entity.

16. The computer-readable medium of claim 15, the set of entity data associated with at least one of a function, a method, a class, a variable, or an object.

17. The computer-readable medium of claim 15, the method comprising:
determining an entity candidate based upon querying a range table using information within the entity meaning request; and performing the entity candidate recursive semantic parse upon the entity candidate to determine whether the entity candidate comprises the programming entity.

18. The computer-readable medium of claim 17, the performing the entity candidate recursive semantic parse upon the entity candidate comprising:

determining a location of the entity candidate within the source code file based upon querying the name table; and performing the entity candidate recursive semantic parse upon the location of the entity candidate.

19. The computer-readable medium of claim 15, the performing an entity candidate recursive semantic parse comprising:

for respective undefined programming entities not defined within an internal symbol table, performing the entity candidate recursive semantic parse to determine a defined programming entity and determining whether the defined programming entity comprises the programming entity.

20. The computer-readable medium of claim 15, the method comprising:

building a range table based upon the name table, the range table comprising:

a position column configured to store beginning positions and ending positions from the name table; and an entity column configured to store programming entities relative to positions in the position column.

* * * * *